(12) United States Patent
Dalal et al.

(10) Patent No.: US 11,964,611 B2
(45) Date of Patent: Apr. 23, 2024

(54) AUTONOMOUS CABIN LIGHTING SYSTEMS FOR VEHICLES

(71) Applicant: Toyota Motor Engineering & Manufacturing North America, Inc., Plano, TX (US)

(72) Inventors: Sunil Dalal, Canton, MI (US); John D. Harkleroad, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/568,334

(22) Filed: Jan. 4, 2022

(65) Prior Publication Data

US 2023/0211728 A1 Jul. 6, 2023

(51) Int. Cl.
*B60Q 3/80* (2017.01)
*B60Q 3/18* (2017.01)
*H04W 4/46* (2018.01)

(52) U.S. Cl.
CPC .............. *B60Q 3/80* (2017.02); *B60Q 3/18* (2017.02); *H04W 4/46* (2018.02)

(58) Field of Classification Search
CPC .............. H04W 4/46; B60Q 3/18; B60Q 3/80
See application file for complete search history.

(56) References Cited

U.S. PATENT DOCUMENTS

| | | | |
|---|---|---|---|
| 5,534,845 A | 7/1996 | Issa et al. | |
| 8,742,664 B2 | 6/2014 | Lee et al. | |
| 9,517,722 B2* | 12/2016 | Ito | B60Q 3/74 |
| 9,725,036 B1* | 8/2017 | Tarte | B60W 50/16 |
| 2003/0128112 A1* | 7/2003 | Chow | B60Q 1/54 340/466 |
| 2015/0217689 A1 | 8/2015 | Frik et al. | |
| 2018/0113476 A1* | 4/2018 | Giles | G05D 1/0295 |
| 2021/0099847 A1* | 4/2021 | Uchiyama | H04B 7/0695 |
| 2021/0103747 A1* | 4/2021 | Moustafa | G06V 20/584 |
| 2021/0235242 A1* | 7/2021 | Shin | G05D 1/0291 |
| 2022/0351612 A1* | 11/2022 | Asahara | G08G 1/0112 |
| 2023/0030288 A1* | 2/2023 | Matsumoto | B60W 40/08 |

FOREIGN PATENT DOCUMENTS

| | | |
|---|---|---|
| CN | 102490651 A | 6/2012 |
| CN | 204340853 U | 5/2015 |
| CN | 104527514 B | 9/2016 |
| DE | 102011115168 A1 | 4/2012 |
| EP | 3231667 A1 | 10/2017 |
| IN | 112824152 A | 5/2021 |
| JP | 2002114091 A | 4/2002 |
| JP | 2010176382 A | 8/2010 |
| JP | 5487841 B2 | 5/2014 |

OTHER PUBLICATIONS

"Interior Lighting Control" Clemson Vehicular Electronics Labratory, (https://cecas.clemson.edu/cvel/auto/systems/interior_lighting.html), Accessed Jan. 4, 2022.

* cited by examiner

*Primary Examiner* — Alexander H Taningco
*Assistant Examiner* — Pedro C Fernandez
(74) *Attorney, Agent, or Firm* — Dinsmore & Shohl LLP

(57) ABSTRACT

A method of autonomously controlling interior lighting of an occupied vehicle is provided. The method includes receiving vehicle-to-vehicle information from a nearby vehicle. A controller controls an illumination setting of an interior light of the occupied vehicle based on the vehicle-to-vehicle information.

12 Claims, 3 Drawing Sheets

AUTONOMOUS CABIN LIGHTING SYSTEMS FOR VEHICLES

TECHNICAL FIELD

The present specification generally relates to lighting systems for vehicles and, in particular lighting systems that automatically adjust illumination settings based on a driving environment.

BACKGROUND

The intensity of cabin lights (meter cluster, ambient lights, navigation system, etc.) can be increased and decreased by a control knob and this control is driver dependent. Dome lights can be controlled by a switch (unless a door is open), irrespective of driving condition (parked, moving slow or fast). For cabin lights, many drivers do not change the intensity of the cabin lights regularly. Because of this, the cabin lights are often left in one position, which could impact the driver's ability to see far down the road (if the cabin lights are too bright). For dome lamps, in case of need, such as when the car is parked, the driver has to turn on the lights by a toggle/push switch.

Accordingly, a need exists to provide lighting systems that automatically adjust illumination setting based on a driving environment.

SUMMARY

In one embodiment, a method of autonomously controlling interior lighting of an occupied vehicle is provided. The method includes receiving vehicle-to-vehicle information from a nearby vehicle. A controller controls an illumination setting of an interior light of the occupied vehicle based on the vehicle-to-vehicle information.

In another embodiment, a vehicle including a lighting control system that autonomously controls interior lights of a vehicle based on driving conditions includes one or more processors and one or more memory modules communicatively coupled to the one or more processors. A network interface module is configured for vehicle-to-vehicle communication. Machine readable instructions are stored in the one or more memory modules that cause the one or more processors to control an illumination setting of an interior light of the vehicle based on a vehicle-to-vehicle communication.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicle lighting systems that can automatically adjust illumination setting of cabin lighting based on a driving environment. The lighting systems can utilize vehicle-to-infrastructure (V2I) and/or vehicle-to-vehicle (V2V) systems to obtain driving environment information. Vehicle sensors may be used to collect vehicle and environmental information used by the lighting system to adjust illumination settings.

It is noted that the present disclosure may be applied to any vehicle. It is contemplated that the vehicle may or may not be an autonomous vehicle or a partially autonomous vehicle. When referring to autonomous or partially autonomous vehicles, it is meant to refer to vehicles having at least one drive mode wherein a human operator is not necessary to guide the vehicle. However, embodiments of the present disclosure are also applicable to fully human drivable vehicles.

Figure 1:
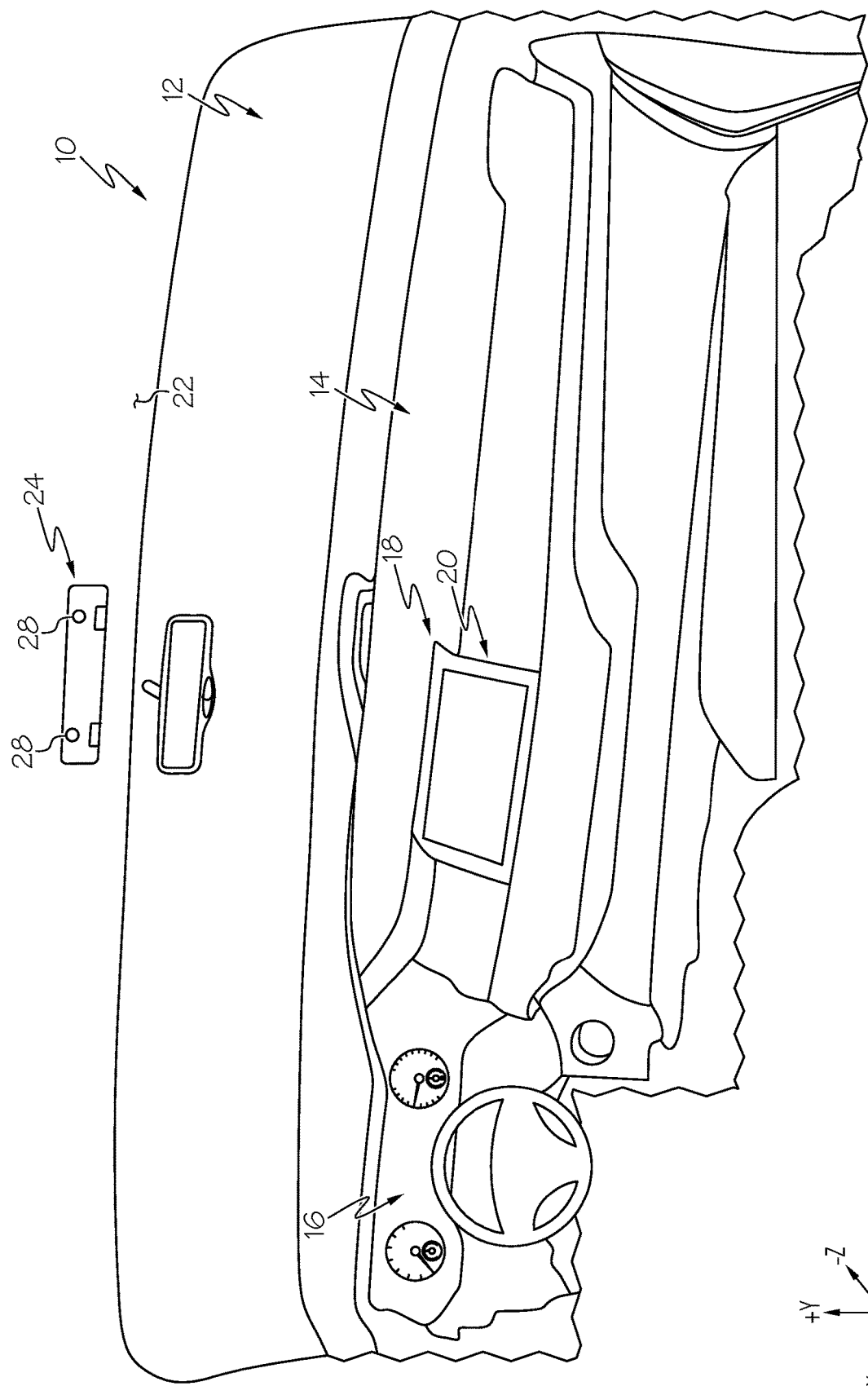
FIG. 1 depicts an interior of a cabin of a vehicle, according to one or more embodiments shown and described herein.

Referring to FIG. 1, an interior of a vehicle 10 is illustrated and, in particular, an interior of a cabin 12 of the vehicle 10. The cabin 12 includes a dashboard 14 that includes an instrument panel 16 and a display 18 for a head unit 20 of the vehicle 10. The term "head unit," sometimes referred to as an infotainment system, refers to a component providing a unified hardware interface, including screens buttons and system controls for information and entertainment. Located overhead on a roof 22 of the vehicle 10 is an overhead light 24. The overhead light 24 includes light sources 26 and 28 and controls that can be used to activate and deactivate the light sources 26 and 28. As described below, illumination settings, such as intensity, color timing, etc., can be controlled by an electronic control unit (ECU) based on driving conditions.

Figure 2:
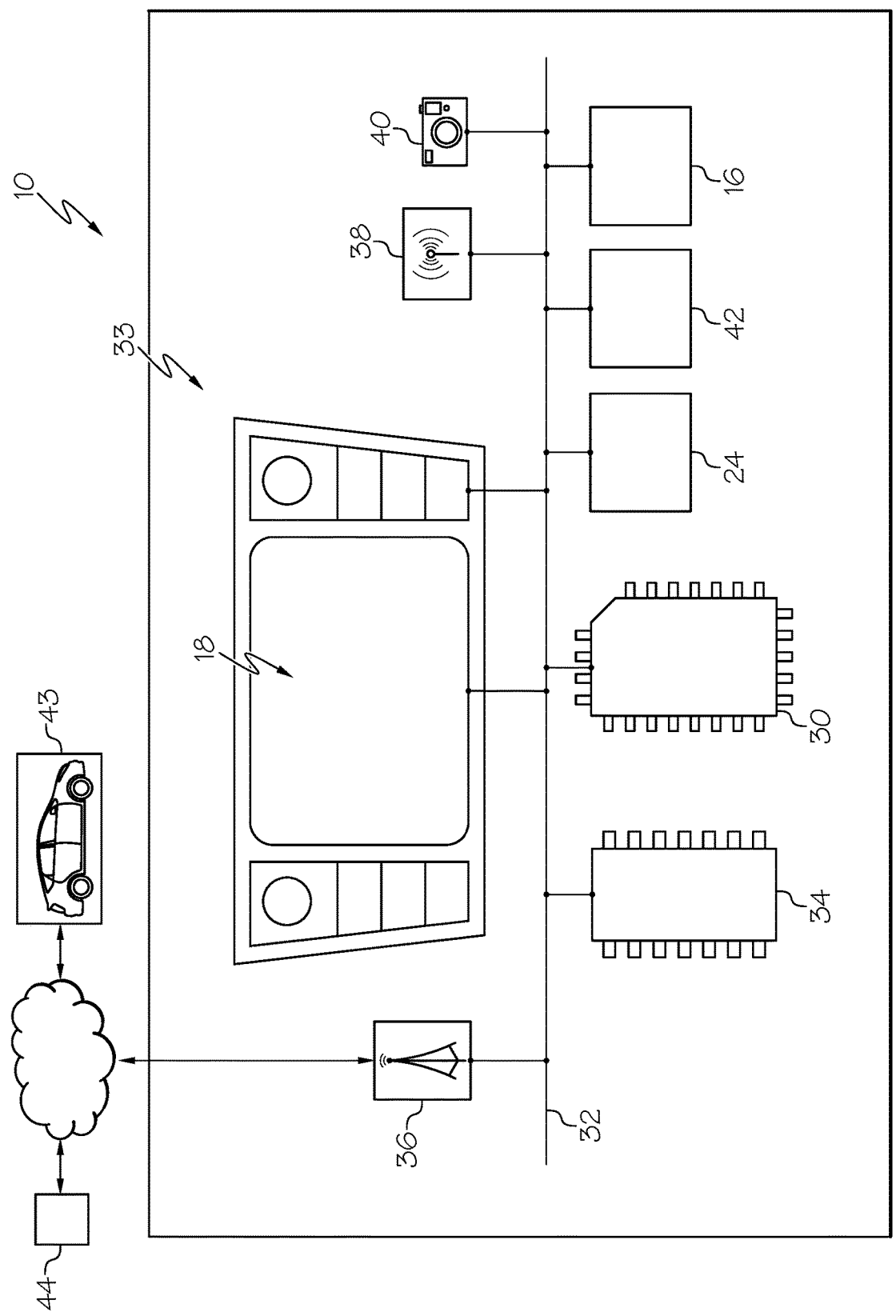
FIG. 2 schematically depicts a lighting control system for the vehicle of FIG. 1, according to one or more embodiments shown and described herein.

Referring to FIG. 2, the object vehicle 10 includes a lighting control system 33 that utilizes sensors, V2I and/or V2V systems to obtain current environmental driving information. The lighting control system 33 includes one or more processors 30. Each one or more processor 30 may be any device capable of executing machine readable instructions. Accordingly, each one or more processor 30 may be a controller, an integrated circuit, a microchip, a computer, or any other computing device. The one or more processors 30 are coupled to a communication path 32 that provides signal interconnectivity between various modules. Accordingly, the communication path 32 may communicatively couple any number of processors 30 with one another, and allow the modules coupled to the communication path 32 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 32 may be formed from any medium that is capable of transmitting a signal such as, for example, conductive wires, conductive traces, optical waveguides, or the like. In some embodiments, the communication path 32 may facilitate the transmission of wireless signals, such as WiFi, Bluetooth, and the like. Moreover, the communication path 32 may be formed from a combination of mediums capable of transmitting signals. In one embodiment, the communication path 32 comprises a combination of conductive traces, conductive wires, connectors, and buses that cooperate to permit the transmission of electrical data signals to components such as processors, memories, sensors, input devices, output devices, and communication devices. Accordingly, the communication path 32 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle 10 further includes one or more memory modules 34 coupled to the communication path 32. The one or more memory modules 34 may comprise RAM, ROM, flash memories, hard drives, or any device capable of storing machine readable instructions such that the machine readable instructions can be accessed by the one or more processors 30. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 56. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 34 may include a database that includes navigation information and/or map information including information pertaining to traffic signal locations, available traffic signal types, etc. The vehicle 10 may display on the display 18 road parameters and traffic signal information available from the one or more memory modules 34. In some embodiments, a GPS unit 38 may be provided that can provide a variety of map and traffic signal information for the display 18. As an example, and not a limitation, road parameters may include lane lines, on/off ramps, and barriers. Furthermore, the one or more memory modules 34 may include an image recognition database or algorithm to allow the object vehicle 10 to identify a target object type sensed within a vicinity of the object vehicle 10.

The object vehicle 10 comprises the display 18 for providing visual output such as, for example, maps, navigation, entertainment, information, or a combination thereof. As will be described in greater detail below, the display 18 can also provide visual output of the current environmental driving conditions sensed or otherwise learned of, such as through V2I and V2V. The display 18 is coupled to the communication path 32, as shown in FIG. 2. Accordingly, the communication path 32 communicatively couples the display 18 to other modules of the object vehicle 10. The display 18 may include any medium capable of transmitting an optical output such as, for example, a cathode ray tube, light emitting diodes, a liquid crystal display, a plasma display, or the like. Moreover, the display 18 may be a touch screen that, in addition to providing optical information, detects the presence and location of a tactile input upon a surface of or adjacent to the display 18. Accordingly, the display 18 may receive mechanical input directly upon the optical output provided by the display 18. Additionally, it is noted that the display 18 can include at least one of the one or more processors 30 and the one or memory modules 34. As noted above, the display 18 can be at least one of a heads-up display, an instrument cluster display, and a mobile device display. In some embodiments, the vehicle 10 may have a plurality of displays. In such embodiments, the vehicle 10 can also have a plurality of different types of displays at various locations within the vehicle 10. For example, and not as a limitation, the vehicle 10 can have an in-dashboard display and a heads-up display for displaying information directly on a windshield or window of the vehicle 10.

In some embodiments, the vehicle 10 comprises network interface module 36 for communicatively coupling the vehicle 10 to an oncoming vehicle 43 such that data can be sent between the vehicle 10 and oncoming vehicle 43 (V2V) or other vehicles or infrastructure (V2I). For instance, the vehicle 10 and oncoming vehicle 43 may send and receive information relevant to current traffic signal status information, speed, road conditions, oncoming obstacles, etc. The network interface module 36 can be communicatively coupled to the communication path 32 and can be any device capable of transmitting and/or receiving data via a network. Accordingly, the network interface module 36 can include a communication transceiver for sending and/or receiving any wired or wireless communication. For example, the network interface module 36 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface module 36 includes hardware configured to operate in accordance with the Bluetooth wireless communication protocol. In another embodiment, network interface module 36 may include a Bluetooth send/receive module for sending and receiving Bluetooth communications to/from a mobile device.

The vehicle 10 may include one or more sensors, generally referenced as element 40, communicatively coupled to the one or more processors 32. The one or more sensors 40 may be used in conjunction with V2V or V2I communications. The one or more sensors 40 may include, but are not limited to, cameras, LiDAR, RADAR, proximity sensors, speed sensors, etc. In some embodiments, multiple types of sensors are used to provide a variety of information to the vehicle 10.

For instance, FIG. 2 illustrates the object vehicle 10 utilizing a variety of sensors 40. A camera 40 may be coupled to the communication path 32 such that the communication path 32 communicatively couples the camera 40 to other modules of the vehicle 10. The camera 40 may be any device having an array of sensing devices (e.g., pixels) capable of detecting radiation in an ultraviolet wavelength band, a visible light wavelength band, or an infrared wavelength band. The camera 40 may have any suitable resolution. Some embodiments may include multiple cameras. In operation, the camera 40 may be used to detect an environmental driving condition within a vicinity of the vehicle 10. The camera 40 and/or the one or more processors 30, based on input from the camera 40, may be able to also determine the type of objects the camera 40 is capturing through image recognition capabilities. For example, the camera 40 and/or the one or more processors 30 may be able to determine whether an object is another vehicle, such as an emergency vehicle.

Still referring to FIG. 2, the vehicle 10 may further include another sensor or sensors 42 in addition to the camera 40. The sensor 42 is coupled to the communication path 32 such that the communication path 32 communicatively couples the sensor 42 to other modules of the vehicle 10. The sensor 42 may be any device capable of outputting a signal indicative of the speed, direction of travel, and the general proximity of the oncoming vehicle 43 to the vehicle 10. In some embodiments, the sensor 42 may include RADAR, LiDAR, or the like. As described above, any sensor or combinations of sensors 40, 42 may be used to detect and monitor the driving environment. Other V2V and/or V2I capable vehicles, such as the oncoming vehicle 43 may include any one or more of the components described above for communication between vehicles, including the vehicle 10. Based on the driving information collected, the processor 30 can control the illumination settings of any of the lighting sources in the cabin 12, such as the instrument panel 16, the display 18 and the overhead light 24 based on logic saved in the memory 34.

Figure 3:
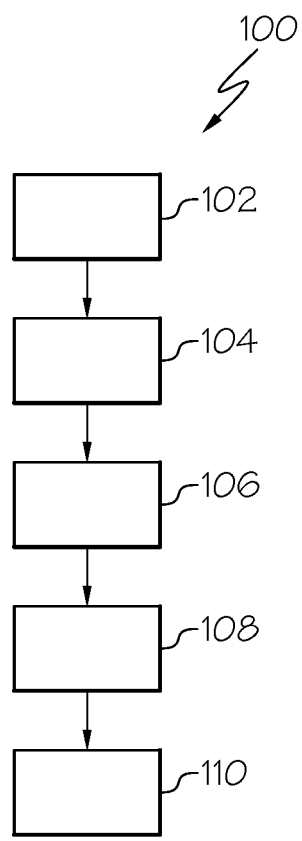
FIG. 3 depicts a method of automatically controlling a vehicle light using the lighting control system of FIG. 2, according to one or more embodiments shown and described herein.

Referring to FIG. 3, a process 100 for autonomously controlling the interior lighting using the lighting control system 33 is illustrated. At step 102, the lighting control system 33 collects driving information using the sensors 40, 42, such as speed, weather, etc. For example, at higher speeds, the processor 30 may lower the intensity of the instrument panel 16 and the display 18 at step 104. If the overhead light 24 is ON, the controller may lower it's intensity or even turn it OFF, for example, at zero velocity. At lower speeds including zero velocity, the processor 30 may raise the intensity of the instrument panel 16 and the display 18 at step 106. At very low velocity, such as zero, the controller may turn ON the overhead light 24. At step 108, the lighting control system 33 may receive V2V information from a nearby vehicle. For example, the V2V information may indicate that the nearby vehicle is an emergency vehicle. If the vehicle is stopped, the processor 30 may turn ON the overhead light 24 at step 110.

The lighting control system 33 can be customized by the driver in accordance with driver preferences. For example, the extremes of the intensity levels can be selected by the driver and customized based on who is driving. Further, the autonomous control of the lighting control system 33 may be deactivated by the driver, if desired. Any suitable customization based on driver preferences can be selected.

The above-described intersection traffic signal indicator systems allow a vehicle driver to determine whether or not a vehicle at an intersection has the "go ahead" to turn into traffic. The object vehicle can utilize V2V or V2I to determine the status of an opposing or any other traffic light status at an intersection and display a reproduction of the traffic light, or even the entire traffic light device with traffic light on one or more vehicle display. Providing the status of other traffic lights at an intersection can provide the driver of the object vehicle with traffic signal information to make a more informed decision as to whether or not to execute a move, such as a turn, while stopped at the intersection.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of autonomously controlling interior lighting of an occupied vehicle, the method comprising:
   receiving vehicle-to-vehicle information from a nearby vehicle; and
   a controller controlling an illumination setting of an interior light of the occupied vehicle based on the vehicle-to-vehicle information;
   wherein the controller turning the interior light ON if the vehicle-to-vehicle information indicates to the controller that the nearby vehicle is an emergency vehicle and the controller determines that the occupied vehicle is stopped;
   wherein an intensity level of the interior light of the occupied vehicle is reduced by the controller if the interior light is ON and the vehicle speed increases.

2. The method of claim 1, wherein the step of the controller controlling the illumination setting comprises turning an overhead light ON.

3. The method of claim 1, wherein an intensity level of an instrument panel of the occupied vehicle is reduced if the vehicle speed increases.

4. The method of claim 3, wherein the intensity level of the instrument panel of the occupied vehicle is increased if the vehicle speed decreases.

5. The method of claim 1, wherein an intensity level of a display of the occupied vehicle is reduced if the vehicle speed increases.

6. The method of claim 5, wherein the intensity level of the display of the occupied vehicle is increased if the vehicle speed decreases.

7. A vehicle comprising a lighting control system that autonomously controls interior lights of a vehicle based on driving conditions comprising:
   one or more processors;
   one or more memory modules communicatively coupled to the one or more processors;
   a network interface module configured for vehicle-to-vehicle communication; and
   machine readable instructions stored in the one or more memory modules that cause the one or more processors to control an illumination setting of an interior light of the vehicle based on a vehicle-to-vehicle communication;
   wherein the one or more processors configured to turn the interior light ON if the vehicle-to-vehicle communication indicates to the controller that the nearby vehicle is an emergency vehicle and the controller determines that the occupied vehicle is stopped;
   wherein the controller is configured to reduce an intensity level of the interior light of the occupied vehicle if the interior light is ON and the vehicle speed increases.

8. The vehicle of claim 7, wherein the one or more processors controlling the illumination setting comprises turning an overhead light ON.

9. The vehicle of claim 7, wherein an intensity level of an instrument panel of the occupied vehicle is reduced by the one or more processors if the vehicle speed increases.

10. The vehicle of claim 9, wherein the intensity level of the instrument panel of the occupied vehicle is increased by the one or more processors if the vehicle speed decreases.

11. The vehicle of claim 7, wherein an intensity level of a display of the occupied vehicle is reduced by the one or more processors if the vehicle speed increases.

12. The vehicle of claim 11, wherein the intensity level of the display of the occupied vehicle is increased by the one or more processors if the vehicle speed decreases.

* * * * *